US012148551B2

(12) United States Patent
Consonni et al.

(10) Patent No.: US 12,148,551 B2
(45) Date of Patent: Nov. 19, 2024

(54) CABLE WITH JOINTS FOR THE CONNECTION OF CABLE ARMOUR NON-METALLIC ELEMENTS

(71) Applicant: Prysmian S.p.A., Milan (IT)

(72) Inventors: Enrico Maria Consonni, Milan (IT); Federico Cordo', Milan (IT)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 18/190,767

(22) Filed: Mar. 27, 2023

(65) Prior Publication Data

US 2023/0326627 A1 Oct. 12, 2023

(30) Foreign Application Priority Data

Apr. 12, 2022 (IT) .......................... 102022000007280

(51) Int. Cl.
  *H01B 7/18* (2006.01)
  *F16B 7/04* (2006.01)
  *H01B 9/00* (2006.01)

(52) U.S. Cl.
  CPC ............. *H01B 9/00* (2013.01); *F16B 7/0433* (2013.01)

(58) Field of Classification Search
  CPC ...... H01B 7/182; H01B 7/1825; F16B 7/0433
  (Continued)

(56) References Cited

U.S. PATENT DOCUMENTS

| 4,043,690 | A |   | 8/1977  | Browne |          |
| 4,059,951 | A | * | 11/1977 | Roe    | D07B 5/10 |
|           |   |   |         |        | 57/215 |

(Continued)

FOREIGN PATENT DOCUMENTS

| DE | 2638531 A1 | 3/1977 |
| FR | 2146850 A5 | 3/1973 |

(Continued)

OTHER PUBLICATIONS

Furugen et al., "Completion of Submarine Cable Lines Combining Low Environmental Impact with Low Cost", Furukawa Review No. 21, 2002, 6 pages.

*Primary Examiner* — Chau N Nguyen
(74) *Attorney, Agent, or Firm* — Slater Matsil, LLP (57) ABSTRACT

The present disclosure relates to a cable comprising a cable core and an armor, the armor being formed by a plurality of consecutive sections of non-metallic tensile elements wound around the cable core, each section including a first non-metallic tensile element connected to a second non-metallic tensile element of the consecutive sections by a joint comprising a first socket and a second socket, each of said sockets comprising a flat body extending longitudinally along a longitudinal axis (S) between a proximal end and a distal end and comprising an inner through bore between a proximal aperture at the proximal end and a distal aperture at the distal end, the first and second non-metallic tensile elements having an end portion being housed in the inner through bore of respectively the first and second socket by the proximal aperture and secured therein by a bonding material, and each inner through bore being shaped to translationally and rotationally lock the bonding material; an interconnecting device translationally and rotationally locked in the distal apertures of the first and the second sockets and allowing the sockets to relatively rotate exclusively around at least one rotation axis (R) perpendicular to a plane where the socket body longitudinal axes (S) of the first and the second sockets lie.

17 Claims, 4 Drawing Sheets

(58) Field of Classification Search
USPC .................................................. 403/275, 296
See application file for complete search history.

(56) References Cited

U.S. PATENT DOCUMENTS

| | | | | |
|---|---|---|---|---|
| 4,464,812 A | * | 8/1984 | Crook, Jr. | ............. F16G 11/025 |
| | | | | 294/102.1 |
| 4,489,828 A | * | 12/1984 | Stipdonk | ................ B65G 15/34 |
| | | | | 24/31 W |
| 4,652,166 A | | 3/1987 | Gautron | |
| 4,965,411 A | * | 10/1990 | Bruneval | ................ H02G 15/14 |
| | | | | 156/49 |
| 5,890,684 A | * | 4/1999 | Stewart | ..................... F16L 3/23 |
| | | | | 248/68.1 |
| 8,088,138 B2 | * | 1/2012 | Pandey | .......... A61B 17/320016 |
| | | | | 606/190 |
| 2019/0228876 A1 | * | 7/2019 | Consonni | ............... H01B 7/183 |

FOREIGN PATENT DOCUMENTS

| | | |
|---|---|---|
| GB | 1381690 A | 1/1975 |
| GB | 2313853 A | 12/1997 |
| WO | 2018059685 A1 | 4/2018 |

\* cited by examiner

CABLE WITH JOINTS FOR THE CONNECTION OF CABLE ARMOUR NON-METALLIC ELEMENTS

CROSS-REFERENCE TO RELATED APPLICATIONS

This application claims priority to Italian Application No. 102022000007280, filed on Apr. 12, 2022, which application is hereby incorporated herein by reference.

TECHNICAL FIELD

The present disclosure relates to a cable with a joint for connecting non-metallic elements forming a cable armor, particularly a submarine or an umbilical cable.

BACKGROUND

Submarine and umbilical cables may comprise an armor having one or more layer of wires usually made of metal (e.g. steel or composite comprising steel).

New submarine power cables and umbilical cables have been developed which employ non-metallic lightweight tensile elements as armor wires which allows decreasing the total weight of the cable and thus its deployment in very deep water (typically 2,000 m or more).

Armor strength elements are wound on the cable core in unilay configuration using machine with rotating cages equipped with the necessary number of bobbins. Each single armor element is unwound by an individual bobbin that, depending on the armor unit size, can generally carry few kilometres (typically every 1-3 km) of the armor element itself.

Typical length of a submarine cable loaded on an installation vessel, depending on the specific design, can range between 100 and 200 km. It is therefore necessary to link the armor elements during cable manufacturing.

While the jointing of armor metallic elements is made with well-known techniques, jointing non-metallic strength elements is generally more difficult in terms of suitable mechanical continuity, dimensions, process speed and environmental resistance of the non-metallic elements.

Furugen M. et al., "Completion of Submarine Cable Lines Combining Low Environmental Impact with Low Cost", Furukawa Review No. 21, 2002, p. 44, relates to a 22 kV submarine cable with a double armor, and the compound armor consisted of high-density polyethylene sheathed FRP (fiberglass-reinforced-plastic) for the first layer. For FRP, splicing technology is crucial in that, depending on the formation of the splice, the drop in tensile strength of the FRP wire may be greater than desired. The splicing method developed for use in this work involves crimping of a stainless steel sleeve.

Several other solutions are known in the art, which however relate to jointing ropes and not non-metallic cable armor elements.

GB 1 381 690 relates to swage sockets useful to connect lengths of wire rope to other lengths of wire rope and to fixed connectors. A wire rope has a two-piece swage socket swaged to it, and this swage socket is connected by a connecting pin to a two-piece swage socket fixedly connected to one pulley block. The rope swage socket includes an open (clevis) pin receiving section, while the pulley block swage socket includes a closed (tongue) pin receiving section. These swage sockets also include shank sections. Open and closed pin receiving sections each includes a reduced neck portion integrally connected to a clevis or tongue end piece and a part spherical ball portion integrally connected to the neck portion. Each of the part spherical balls of the pin receiving sections is mounted for rotational movement and limited pivotal movement with respect to a mating cup portion of one of the shank members.

U.S. Pat. No. 4,652,166 relates to a device for connecting two cables together, comprising a short linking rod having a partially spherical member at each end thereof, a first pair of sockets, each socket of said first pair receiving a respective one of said spherical members and forming a ball and socket joint therewith, and a second pair of sockets, each socket of said second pair being detachably connected to a respective one of the sockets of said first pair and having an axial passage receiving one end portion of one of the two cables to be connected, wherein each socket of the second pair has a generally cylindrical outer shape and its axial passage is also cylindrical with a diameter corresponding to that of the end portion of the cable received therein, and each socket of the second pair is secured to the end portion of the corresponding cable by constricting said socket of said second pair through a constricting die.

GB 2 313 853 relates to a rope terminated in the tapered bore of a housing. The rope end is secured in the bore by a conical wedge, by a resin, or by a combination of these.

SUMMARY

In an embodiment, a cable includes a cable core and an armor comprising a plurality of consecutive sections of non-metallic tensile elements wound around the cable core. Each section includes a first non-metallic tensile element connected to a second non-metallic tensile element of the consecutive sections by a joint. The joint includes a first socket and a second socket, where each of the first and second sockets comprise a flat body extending longitudinally along a longitudinal axis between a proximal end and a distal end and comprise an inner through bore between a proximal aperture at the proximal end and a distal aperture at the distal end, the first and second non-metallic tensile elements having an end portion being housed in the inner through bore of respectively the first and second socket by the proximal aperture and secured therein by a bonding material. Each inner through bore is shaped to translationally and rotationally lock the bonding material. The joint includes an interconnecting device translationally and rotationally locked in the distal apertures of the first and the second sockets and allowing the sockets to relatively rotate exclusively around at least one rotation axis perpendicular to a plane where the socket body longitudinal axes of the first and the second sockets lie.

In an embodiment, a cable comprises a cable core an armor comprising a plurality of consecutive sections of non-metallic tensile elements wound around the cable core, each section including a first non-metallic tensile element connected to a second non-metallic tensile element of the consecutive sections by a joint. The joint comprises a first socket and a second socket, each of the first and second sockets comprising a flat body extending longitudinally along a longitudinal axis between a proximal end and a distal end and comprising an inner through bore between a proximal aperture at the proximal end and a distal aperture at the distal end. The first and second non-metallic tensile elements have an end portion being secured within the inner through bore of respectively the first and second socket by the proximal aperture. The joint comprises an interconnecting device translationally and rotationally locked in the distal apertures of the first and the second sockets and allowing the sockets to relatively rotate around at least one rotation axis perpendicular to a plane where the socket body longitudinal axes of the first and the second sockets lie.

BRIEF DESCRIPTION OF THE DRAWINGS

Further characteristics and advantages will be more apparent from the following description of some embodiments given as a way of an example with reference to the attached drawings in which.

DETAILED DESCRIPTION OF ILLUSTRATIVE EMBODIMENTS

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

The present disclosure, in at least one of the aforementioned aspects, can be implemented according to one or more of the following embodiments, optionally combined together.

For the purpose of the present description and of the appended claims, the words "a" or "an" should be read to include one or at least one and the singular also includes the plural unless it is obvious that it is meant otherwise. This is done merely for convenience and to give a general sense of the disclosure.

Embodiments of this application provide a joint for connecting consecutive cable armor non-metallic elements in a quick process which, if necessary, can be completed offline. Advantageously, such joint could have a reduced size for not substantially increasing the overall cable diameter, ensure a suitable mechanical continuity and integrity of the non-metallic elements and not alter the lay loss of the armor elements.

The Applicant found that, while the known methods for splicing cable armor non-metallic elements do not ensure the due mechanical strength continuity, the devices known for jointing ropes are defective in term of dimensions and/or ease of application and/or steric hindrance. As for the latter defect, the Applicant found that a joint suitable for connecting cable armor non-metallic elements should be somewhat flexible in the cable radial direction only, but as rigid as possible in the cable longitudinal direction.

In a first aspect, the present disclosure relates to a cable comprising a cable core and an armor, the armor being formed by a plurality of consecutive sections of non-metallic tensile elements wound around the cable core, each section including a first non-metallic tensile element connected to a second non-metallic tensile element of the consecutive sections by a joint comprising: a first socket and a second socket, each of said sockets comprising a flat body extending along a longitudinal axis between a proximal end and a distal end and comprising an inner through bore between a proximal aperture at the proximal end and a distal aperture at the distal end, the first and second non-metallic tensile element having an end portion being housed in the inner through bore of respectively the first and second socket by the proximal aperture and secured therein by a bonding material, and each inner through bore being shaped to translationally and rotationally lock the bonding material; an interconnecting device translationally and rotationally locked in the distal apertures of the first and the second sockets and allowing the sockets to relatively rotate exclusively around at least one rotation axis perpendicular to a plane where the socket body longitudinal axes of the first and the second sockets lie.

In an embodiment, the non-metallic tensile elements connected by the joint of the present disclosure can have a round or flat cross-section.

In an embodiment, the inner through bore is shaped such that if a traction force along the socket body longitudinal axis in a direction from the distal end towards the proximal end is applied to the non-metallic tensile element, the bonding material securing the non-metallic tensile element end portion is compressed inside the inner through bore.

In an embodiment, at least one portion of the inner through bore is tapered towards the proximal end.

In an embodiment, the inner through bore has a rectangular cross section transversal to the socket flat body longitudinal axis.

In an embodiment, in the inner through bore the length of the longer dimensions of the inner through bore cross section is fixed and the length of the shorter dimensions of the inner through bore cross section decreases along the socket body longitudinal axis towards the proximal end.

In an embodiment, the bonding material securing the end portion of the non-metallic tensile element maybe a thermoset material, for example a polyester or epoxy resin, or a two-part resin.

In an embodiment, the interconnecting device comprises a first block and a second block, extending along a longitudinal axis, and a pivot joining them and allowing relative rotational movements of the first block and the second block around a rotation axis perpendicular to a plane where the blocks longitudinal axes lie, wherein the blocks are locked at a first portion in the respective socket body distal apertures, and are pivotally interconnected at a second portion opposite to the first portion.

In an embodiment, the first and second blocks cross section transversal to the longitudinal axis at their first portions and the respective socket body distal aperture have matching shapes.

In an embodiment, at their first portions the first and second blocks comprise a through hole extending perpendicular to their longitudinal axes, and the respective socket body comprises two opposite ridges protruding along the socket body longitudinal axis from the distal end each having a through hole extending perpendicular to the socket body longitudinal axis and aligned to the block through hole. The interconnecting device can further comprise a pin or bolt inserted into the aligned block and socket through holes.

In an embodiment, at their second portions the first and second blocks comprise one or more ridges protruding along their longitudinal axes and parallel thereto, each having a through hole perpendicular to the block longitudinal axis, wherein a pin or bolt is inserted. In case more than one ridge is present, their respective through holes are aligned one another so that the pin or bolt is inserted in all of them.

In an embodiment, at their first portions the first and second blocks comprise a plug portion for closing and sealing the distal aperture of the respective socket body.

In the present description and claims, as "lay loss" it is meant a percent difference between the lay length of a stranded element and the actual path length of the stranded element along its helix.

Figure 1:
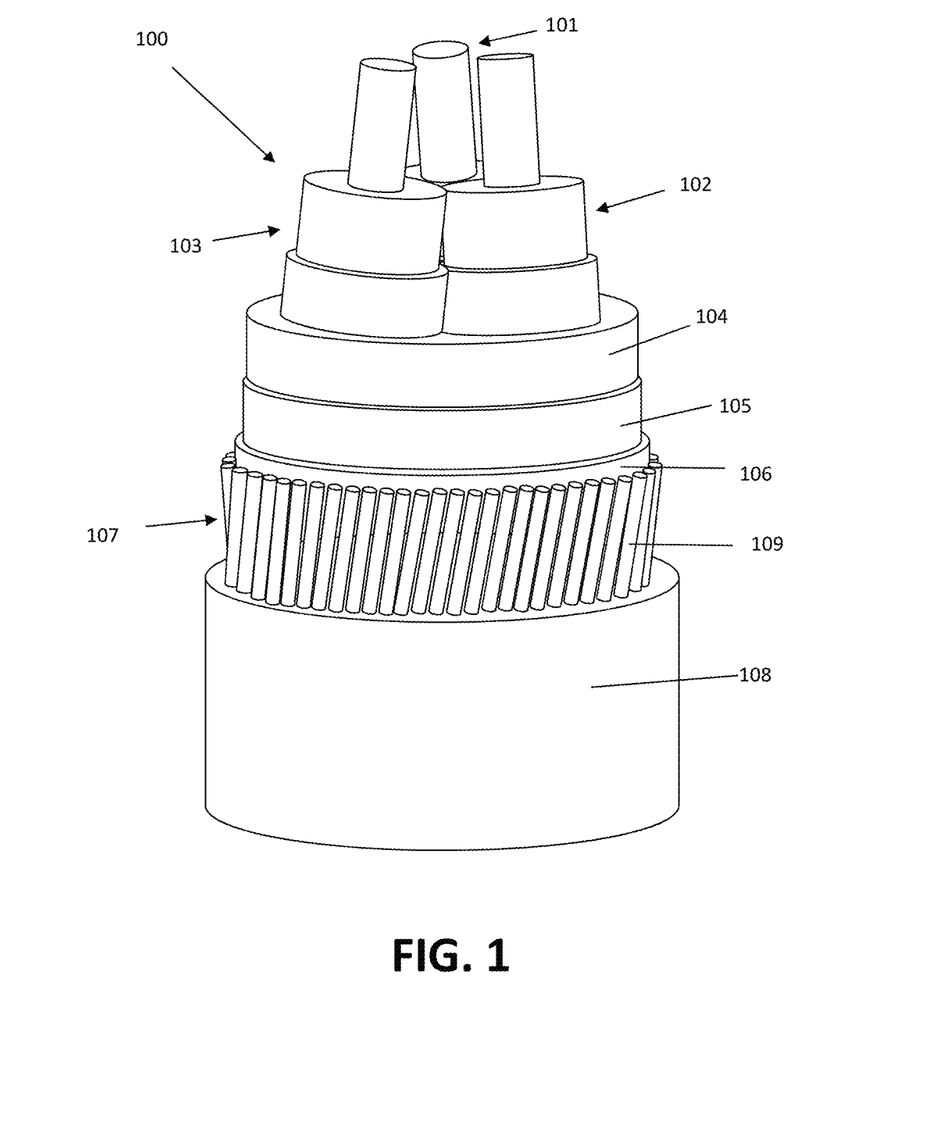
FIG. 1 shows a perspective view of an exemplary submarine cable comprising an armor.

FIG. 1 shows an exemplary submarine cable 100, which can be used for carrying electric power below water surface. A submarine cable 100 can, for example, operate as single phase HVDC (High Voltage Direct Current) or HVAC (High Voltage Alternate Current), or as a tri-phase HVAC cable. For example, the cable 100 comprises three insulated cores 101, 102, 103 for carrying alternate current surrounded by a filler 104.

One or more layers surround the insulated cores 101, 102, 103 and the filler 104, such as e.g. a metallic water barrier 105 and a cushioning layer 106. Around the cushioning layer 106 an armor 107 is provided. The armor 107 comprises a plurality of non-metallic tensile elements 109 wound around the cable cores in unilay manner. The armor may also comprise metallic wires (not illustrated). The armor as shown is FIG. 1 is one section of a plurality of consecutive armor sections comprising non-metallic tensile elements wound around the cable cores in unilay manner, for the reason explained above. The non-metallic tensile elements of one section are jointed to the non-metallic tensile elements of at least one longitudinally preceding or following section by a joint according to the present disclosure, as will be described in more detail below. An outer layer 108 (a jacket or a serving) can surround the armor 107.

Figure 2:
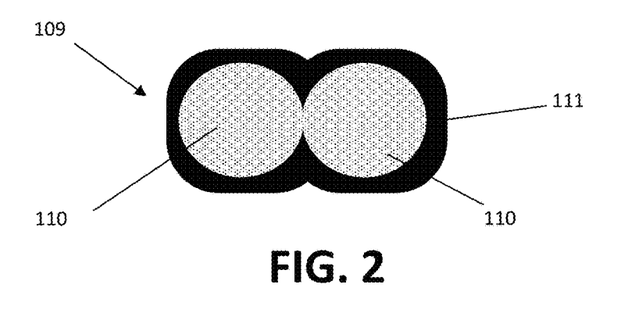
FIG. 2 shows a cross section view of an exemplary cable armor non-metallic tensile element.

FIG. 2 shows a cross section of an exemplary non-metallic tensile element 109 forming the cable armor 107. The non-metallic tensile element of the present disclosure comprises one or more bundles formed by non-metallic fibres. In the case depicted in FIG. 2, the non-metallic tensile element 109 comprises two bundles 110 surrounded by and at least partially separated by an outer jacket 11, and has a flat cross-section. When the non-metallic tensile element comprises more than two bundles, the bundles can be provided in side-by-side configuration to give place to a non-metallic tensile element with a flat cross-section.

For example, the non-metallic fibres are made of a material having a Young's modulus between 50 GPa and 200 GPa, such as aramid, ultra-high molecular weight polyethylene (e.g. Dyneema®) or liquid crystal polymer (e.g. Vectran®).

The outer jacket in, e.g. made of polyethylene, tightly retains the bundle(s) 110. The fibres of the bundle(s) 110 are unidirectional and extend substantially along the longitudinal axis of the non-metallic tensile element 109.

An example of non-metallic tensile element suitable for the present disclosure is described in WO 2018/059685.

Figure 3:
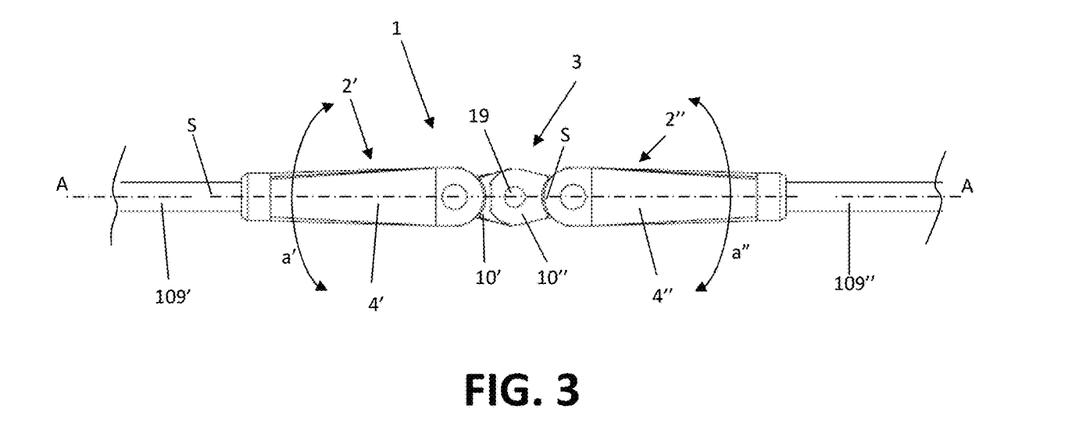
FIG. 3 shows a side view of a joint according to an embodiment of the present disclosure connecting two consecutive non-metallic tensile elements.

With reference to the FIG. 3, the joint 1 comprises a pair of sockets 2, in particular a first socket 2' and a second socket 2", and an interconnecting device 3. Each of the first 2' and the second 2" sockets securely houses an end of a respective armor element 109, in particular a first 109' and a second 109" armor elements, each extending along a longitudinal axis A, and the interconnecting device 3 interconnects the sockets 2', 2" allowing them and the respective armor elements 109', 109" secured therein to relatively rotate exclusively around one or more specific rotation axes, as will be described in more detail below.

Figure 4:
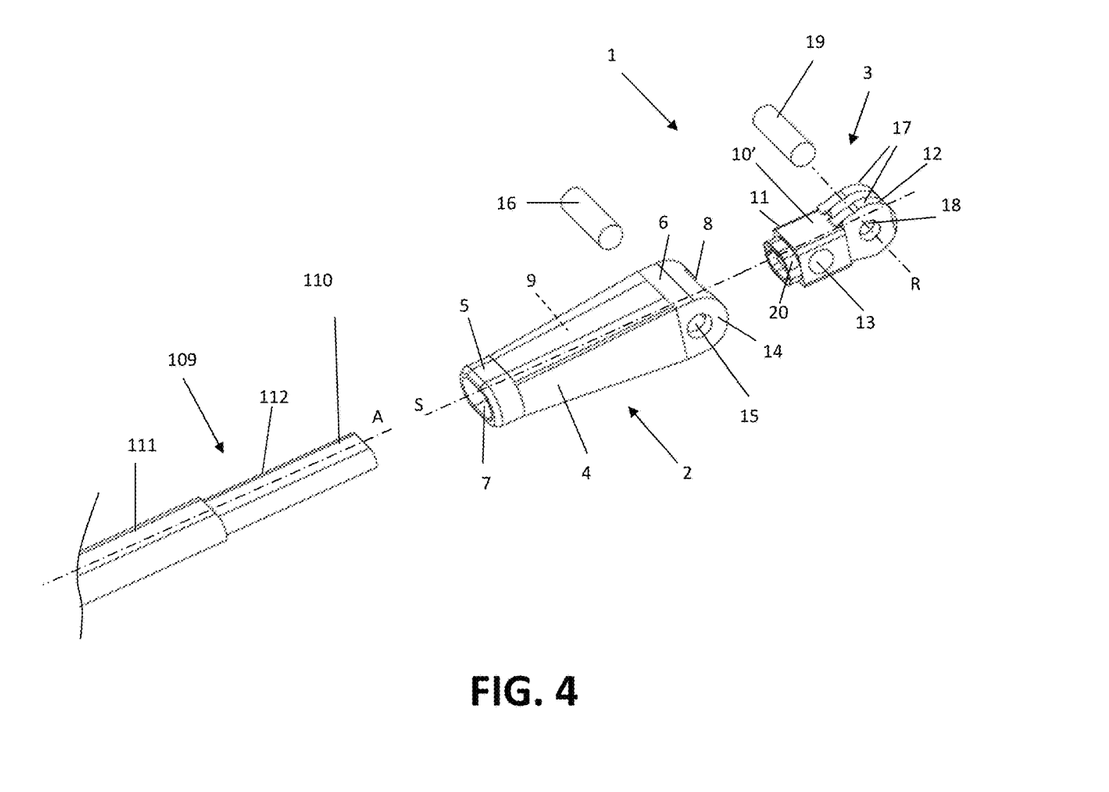
FIG. 4 shows an exploded perspective view of a portion of a joint according to an embodiment of the present disclosure and of an end portion of an armor non-metallic tensile element.
Figure 5A:
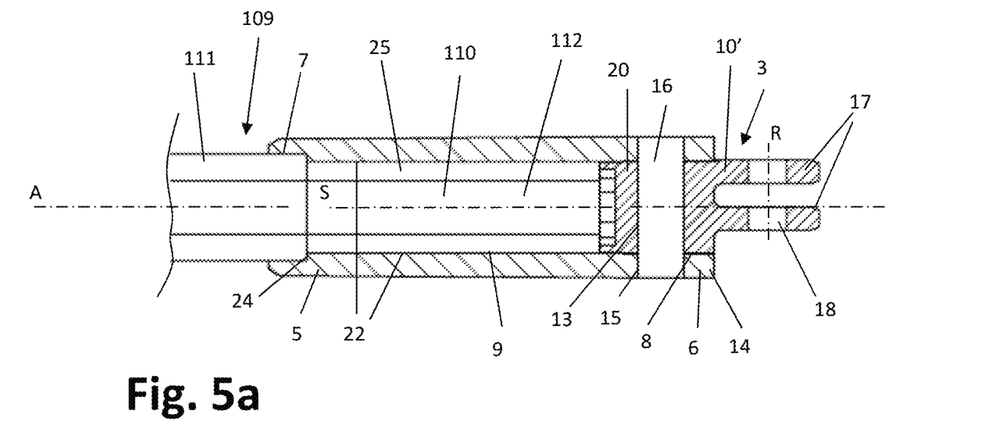
FIGS. 5a and 5b are sectional views taken along two longitudinal planes (parallel respectively to the larger side and the shorter side of the joint) of the joint portion and of the armor non-metallic tensile element end portion of FIG. 4.
Figure 5B:
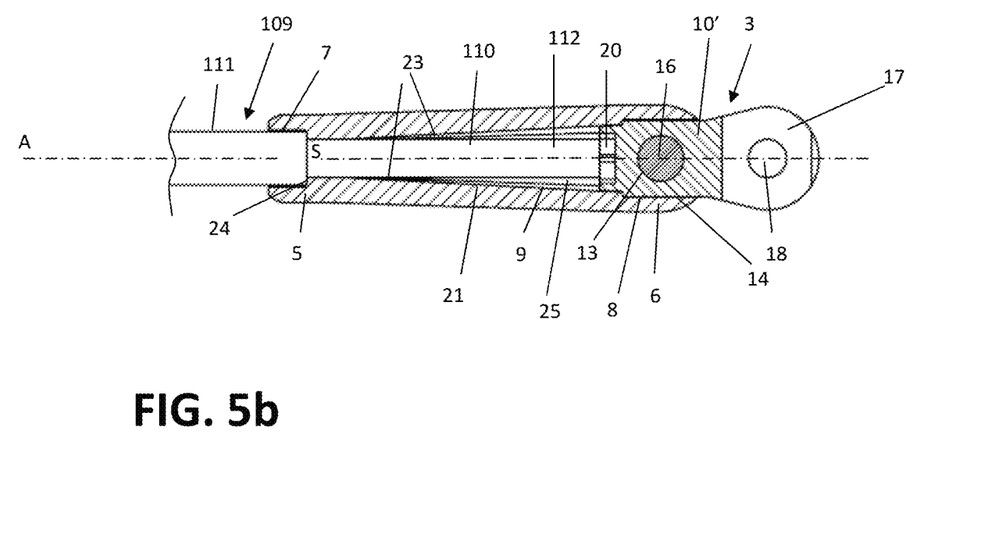

With reference to the FIGS. 4-5 (showing just a portion of the joint in FIG. 3, particularly the left portion with the respective left armor element), each socket 2 comprises a flat body 4, for example a metallic body, extending along a longitudinal axis S between a proximal end 5 and a distal end 6. In the present description and in the annexed claims the "proximal end" is meant the socket end where the respective armor element 109 is received, wherein the "distal end" is the socket end longitudinally opposite to the "proximal end", facing the interconnecting device 3. The socket body 4 has an inner through bore 9 between a proximal aperture 7 at the proximal end 5 and a distal aperture 8 at the distal end 6, the proximal aperture 7 and the distal aperture 8 being in communication by the inner through bore 9.

In an embodiment, at least a portion 21 of the inner bore 9 is tapered towards the proximal end 5, i.e. the inner through bore 9 cross section taken in a plane perpendicular to the longitudinal axis S decreases in the direction from the distal end 6 towards the proximal end 5, or, in other words, increases in the direction from the proximal end 5 towards the distal end 6 (to this regard, see in particular FIG. 5b).

In an embodiment, the inner through bore 9 cross section taken in a plane perpendicular to the longitudinal axis S is rectangular with two opposite shorter sides 22 and two opposite longer sides 23 (to this regard, see FIGS. 5a and 5b). In the present embodiment, the longer sides 23 length is fixed along the longitudinal axis S, whereas the shorter sides 22 length, in the portion 21 of the inner through bore 9, increases towards the distal end 6.

The above-described inner through bore 9 tapered shape is suitable to form a geometric constraint locking rotationally and translationally a solid body having a complementary shape housed inside the inner through bore 9. In particular, the inner through bore 9 shape is suitable to avoid said solid body moving along the axis S and exiting the inner through bore 9 by the proximal aperture 7. The inner through bore 9 tapered trend is such that if a traction force is applied to the solid body along the axis S in a direction from the distal end 6 towards the proximal end 5, the inner through bore 9 tapered walls exert a compression on the solid body. Additionally, the inner through bore 9 shape avoids any rotation of the solid body inside the inner through bore 9, particularly around the longitudinal axis S. For example, this can be achieved by the rectangular shape in cross section of the inner through bore 9. However, in principle the same effect can be achieved with other shapes, e.g. with any polygonal shape or with an elliptical shape of the inner through bore 9 cross section.

The above-described geometry of the inner through bore 9 allows securely locking one non-metallic tensile element 109 in the respective socket 2. In particular, at an end portion 112 of the armor element 109 the outer jacket 111 is removed and at least a portion (for example at least 50% or 60%) of the fibres forming the bundle(s) 110 is inserted into the inner through bore 9 by the proximal aperture 7. In an embodiment, the quantity of outer jacket 111 removed is such that after the insertion, at least a portion of the outer jacket 111 is kept inside the proximal aperture 7. To this purpose, in the embodiment of FIGS. 5a and 5b, the socket body 4 has an abutment 24 for housing the outer jacket 111 within the proximal aperture 7. During the fibre insertion, a quantity of the end portion 112 of the non-metallic tensile element could reach and possibly exit from the distal aperture 8, which is then removed. Then a bonding material 25 is provided, generally poured as fluid, inside the inner through bore 9 where the fibres are inserted, for example through the distal aperture 8. Once the bonding material 25 is cured inside the inner through bore 9, the resulting bonding material 25 forms a solid body having substantially the shape of the inner through bore. Accordingly, the solid bonding material 25 is rotationally and translationally locked inside the inner through bore 9 and the bundle(s) fibres are trapped inside the bonding material 25 inside the inner through bore 9. In this manner the secure locking of the non-metallic tensile element 109 to the respective socket 2 is obtained.

As from FIG. 3, the interconnecting device 3 is locked to two consecutive sockets 2' and 2" at their respective distal apertures 8 (see FIG. 4) and acts as a plug for their inner through bores 9 where the fibres entrapped inside the bonding material 25 are provided. The locking of the interconnection device 3 to the two consecutive sockets 2' and 2" is such that no relative movement (neither translational, nor rotational) is allowed between the interconnection device 3 and the respective sockets 2' and 2". On the other hand, the interconnection device 3 as such is configured so to avoid any relative torsional rotation of the interconnected sockets 2' and 2" (i.e. relative rotations around the respective longitudinal axis S) and so to allow relative rotations of the interconnected sockets exclusively around at least one rotation axis R perpendicular to a plane where the respective longitudinal axes S of the interconnected socket lie. In other words, if one considers the group first socket 2'—interconnecting device 3—second socket 2" as a whole, flectional movements of the group (see the arrows a' and/or a" in FIG. 3) are allowed whereas torsional movements of the group are inhibited. With reference to the embodiment where the socket body inner through bore has a rectangular cross section, the rotational axis R is preferably parallel to longer sides 23 thereof.

The inhibition of any torsional movement of the group socket-interconnecting device-socket avoids the consequent torsional movement of the non-metallic tensile elements connected thereto. When the non-metallic tensile elements are wound around the cable core to build the cable armor, a torsion is applied to them at every turn, a torsion which the non-metallic tensile elements tend to oppose to. During the manufacturing process, such a tendency (to detorsion) is restrained by the link to deploying bobbin and cable surface and by the pay-off tension applied to the non-metallic tensile elements. In the presence of a potential unrestricted point like a joint could be, the non-metallic tensile elements could untwist with undesirable consequence for the cable armor stability and performance. The joint of the present disclosure prevents such an occurrence. This is particularly important when the non-metallic tensile elements have a non-round cross-section, e.g. a flat cross-section.

Referring to FIGS. 3-4, in an embodiment, the interconnecting device 3 comprises a first block 10' and a second block 10" joined by a pivot 19 coaxial to the rotation axis R around which the first block 10' and the second block 10" are rotatable. The blocks 10', 10" are locked by a first portion 11 to the distal ends 6 of respective socket body 4', 4", and rotatably interconnected to the pivot 19 at a second portion 12 opposite to the first portion 11. Once joined to the respective socket body 4', 4", each of the blocks 10', 10" longitudinally develops along the same longitudinal axis S.

In an embodiment, each of the first portions 11 of the first block 10' and the second block 10" has a cross section transversal to the longitudinal axis S matching the shape of the distal aperture 8 of the respective socket body 4 so that the first portion 11 of each the first block and second block 10', 10" can be inserted into a portion of the inner through hole 9 of the respective socket body 4 and no relative rotation is allowed between the sockets and the interconnection device. In an embodiment, the blocks 10', 10" cross section have a substantially rectangular shape.

With reference to the FIGS. 4-5, in an embodiment, the blocks 10', 10" comprise a through hole 13 at the first portion 11 extending perpendicular to the longitudinal axis S. The respective socket body 4 comprises two opposite ridges 14 protruding along the longitudinal axis S from the distal end 6, for example from the shorter sides 22 of the distal aperture 8, each ridge having a through hole 15 extending perpendicular to the longitudinal axis S and aligned with the block through hole 13. A common pin or bolt 16 is inserted in the aligned through holes 13, 15 so to longitudinally connect the blocks 10', 10" to the respective socket body 4.

In an embodiment, each block 10', 10" comprises one or more parallel flanges 17 protruding along the longitudinal axis S from the second portion 12, each flange 17 having a through hole 18 perpendicular to the longitudinal axis S. The flange/s 17 of one block 10', 10" may have the same or different position with respect to the flange/s 17 of the other fronting block 10', 10" with the proviso that the flanges of the blocks 10', 10" fit to attain substantially concentrical through hole 18. The through holes 18 of both the blocks 10', 10" are aligned along the rotation axis R. A common pin or bolt 19 is inserted in the aligned through holes 18 so to longitudinally lock the blocks 10', 10" by allowing them to relatively rotate around the rotation axis R.

In an embodiment, the blocks 10', 10" comprise a plug portion 20 longitudinally protruding along the axis S from their first portions 11 to close and seal the inner through bores 9 of the respective socket body 4 at the distal aperture 8.

In an embodiment, the proximal apertures 7 of the socket bodies 4 are sealed around the outer jackets 11 of the non-metallic tensile element 109 passing therethrough, so that the inner through bores 9 of the socket bodies 4 are closed and sealed at the proximal end 5. The sealing can be made by putty, tape and other means familiar to the skilled person.

Once consecutive non-metallic tensile elements 109', 109" are interconnected by joints 1 according to the present disclosure, they can be wound the underlying cable layer, for example the cushioning layer 106, in the flattest configuration so as the sockets-interconnecting device has a minimized radial thickness.

In an embodiment, the joints of the present disclosure are provided longitudinally spaced one another around the cable diameter.

What is claimed is:

1. A cable comprising:
    a cable core; and
    an armor comprising a plurality of consecutive sections of non-metallic tensile elements wound around the cable core, each section of the plurality of consecutive sections of non-metallic tensile elements including a first non-metallic tensile element connected to a second non-metallic tensile element by a joint, the joint comprising:
        a first socket and a second socket, each of the first and second sockets comprising a flat body extending longitudinally along a longitudinal axis between a proximal end and a distal end and comprising an inner through bore between a proximal aperture at the proximal end and a distal aperture at the distal end, the first and second non-metallic tensile elements having an end portion being housed in the inner through bore of respectively the first and second socket by the proximal aperture and secured therein by a bonding material, and each inner through bore being shaped to translationally and rotationally lock the bonding material, and an interconnecting device translationally and rotationally locked in the distal apertures of the first and the second sockets and allowing the sockets to relatively rotate exclusively around at least one rotation axis perpendicular to a plane where the socket body longitudinal axes of the first and the second sockets lie.

2. The cable of claim 1, wherein the non-metallic tensile elements connected by the joint have a round or flat cross-section.

3. The cable of claim 1, wherein the inner through bore is shaped such that in response to an application of a traction force along the socket body longitudinal axis in a direction from the distal end towards the proximal end, the bonding material securing the non-metallic tensile element end portion is compressed inside the inner through bore.

4. The cable of claim 1, wherein at least one portion of the inner through bore is tapered towards the proximal end.

5. The cable of claim 1, wherein the inner through bore has a rectangular cross section transversal to the socket body longitudinal axis.

6. The cable of claim 5, wherein at least one portion of the inner through bore is tapered towards the proximal end, and wherein the length of the longer sides of the inner through bore cross section is fixed and the length of the shorter sides of the inner through bore cross section decreases along the socket body longitudinal axis towards the proximal end.

7. The cable of claim 1, wherein the bonding material securing the end portion of the non-metallic tensile element is a thermoset material or a two-part resin.

8. A cable comprising:
a cable core; and
an armor comprising a plurality of consecutive sections of non-metallic tensile elements wound around the cable core, each section of the plurality of consecutive sections of non-metallic tensile elements including a first non-metallic tensile element connected to a second non-metallic tensile element by a joint, the joint comprising:
a first socket and a second socket, each of the first and second sockets comprising a flat body extending longitudinally along a longitudinal axis between a proximal end and a distal end and comprising an inner through bore between a proximal aperture at the proximal end and a distal aperture at the distal end, the first and second non-metallic tensile elements having an end portion being housed in the inner through bore of respectively the first and second socket by the proximal aperture and secured therein by a bonding material, and each inner through bore being shaped to translationally and rotationally lock the bonding material, and
an interconnecting device translationally and rotationally locked in the distal apertures of the first and the second sockets and allowing the sockets to relatively rotate exclusively around at least one rotation axis perpendicular to a plane where the socket body longitudinal axes of the first and the second sockets lie, wherein the interconnecting device comprises a first block and a second block, extending along the longitudinal axis, and a pivot joining them and allowing relative rotational movements of the first block and the second block around a rotation axis perpendicular to a plane where the longitudinal axes lie, wherein the blocks are locked at a first portion in the respective socket body distal apertures, and are pivotally interconnected at a second portion opposite to the first portion.

9. The cable of claim 8, wherein the first and second blocks cross section transversal to their longitudinal axes at their first portions and the respective socket body distal aperture have matching shapes.

10. The cable of claim 8, wherein at their first portions the first and second blocks comprise a through hole extending perpendicular to their longitudinal axes, and the respective socket body comprises two opposite ridges protruding along the longitudinal axis from the distal end, each having a through hole extending perpendicular to the socket body longitudinal axis and aligned to the block through hole, wherein the interconnecting device further comprises a pin or bolt inserted into the aligned block and socket through holes.

11. The cable of claim 8, wherein at their second portions the first and second blocks comprise one or more ridges protruding along their longitudinal axes and parallel thereto, each having a through hole perpendicular to the block longitudinal axis, wherein a pin or bolt is inserted.

12. The cable of claim 8, wherein at their first portions the first and second blocks comprise a plug portion for closing and sealing the distal aperture of the respective socket body.

13. A cable comprising:
a cable core; and
an armor comprising a plurality of consecutive sections of non-metallic tensile elements wound around the cable core, each section of the plurality of consecutive sections of non-metallic tensile elements including a first non-metallic tensile element connected to a second non-metallic tensile element by a joint, the joint comprising:
a first socket and a second socket, each of the first and second sockets comprising a flat body extending longitudinally along a longitudinal axis between a proximal end and a distal end and comprising an inner through bore between a proximal aperture at the proximal end and a distal aperture at the distal end, the first and second non-metallic tensile elements having an end portion being secured within the inner through bore of respectively the first and second socket by the proximal aperture, and
an interconnecting device translationally and rotationally locked in the distal apertures of the first and the second sockets and allowing the sockets to relatively rotate around at least one rotation axis perpendicular to a plane where the socket body longitudinal axes of the first and the second sockets lie, wherein the inner through bore has a rectangular cross section transversal to the socket body longitudinal axis.

14. The cable of claim 13, wherein the non-metallic tensile elements connected by the joint have a round or flat cross-section.

15. The cable of claim 13, wherein the inner through bore is shaped such that in response to an application of a traction force along the socket body longitudinal axis in a direction from the distal end towards the proximal end.

16. The cable of claim 13, wherein at least one portion of the inner through bore is tapered towards the proximal end.

17. The cable of claim 13, wherein at least one portion of the inner through bore is tapered towards the proximal end, and wherein the length of the longer sides of the inner through bore cross section is fixed and the length of the shorter sides of the inner through bore cross section decreases along the socket body longitudinal axis towards the proximal end.

\* \* \* \* \*